US012567976B2

(12) United States Patent
Soykan et al.

(10) Patent No.: US 12,567,976 B2
(45) Date of Patent: Mar. 3, 2026

(54) METHODS AND APPARATUSES FOR PERFORMING FEDERATED LEARNING

(71) Applicant: Telefonaktiebolaget LM Ericsson (publ), Stockholm (SE)

(72) Inventors: Elif Ustundag Soykan, Stockholm (SE); Ferhat Karakoc, Istanbul (TR); Leyli Karacay, Istanbul Ümraniye (TR); Pinar Comak, Berlare (BE); Ramin Fuladi, Istanbul (TR); Utku Gülen, Kadiköy (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 18/687,126

(22) PCT Filed: Jul. 11, 2022

(86) PCT No.: PCT/EP2022/069281
§ 371 (c)(1),
(2) Date: Feb. 27, 2024

(87) PCT Pub. No.: WO2023/030730
PCT Pub. Date: Mar. 9, 2023

(65) Prior Publication Data
US 2025/0119296 A1 Apr. 10, 2025

(30) Foreign Application Priority Data
Sep. 3, 2021 (TR) ................................ 2021/013845

(51) Int. Cl.
*G06F 9/32* (2018.01)
*G06N 20/00* (2019.01)
(Continued)

(52) U.S. Cl.
CPC ........... *H04L 9/3247* (2013.01); *G06N 20/00* (2019.01); *H04L 9/0825* (2013.01); *H04L 9/3257* (2013.01)

(58) Field of Classification Search
CPC ... H04L 9/3247; H04L 9/0825; H04L 9/3257; G06N 20/00
See application file for complete search history.

(56) References Cited

U.S. PATENT DOCUMENTS 12,160,504 B2 * 12/2024 Xu ........................ H04L 9/0819
12,243,281 B2 * 3/2025 Li .......................... G06V 10/96
(Continued)

FOREIGN PATENT DOCUMENTS

WO 2021032495 A1 2/2021

OTHER PUBLICATIONS

A Privacy Preserving Federated Learning Scheme Against Poisoning Attacks in Smart Grid (Year: 2024).*
(Continued)

*Primary Examiner* — Shirley X Zhang
(74) *Attorney, Agent, or Firm* — Murphy, Bilak & Homiller, PLLC

(57) ABSTRACT

Embodiments described herein provide methods and apparatuses for performing federated learning, FL. A method in a federated learning, FL, server for performing FL with N client nodes, where N is an integer number greater than 1, comprises: receiving (201, 608a) from a first client node, a first message, the first message comprising: a first public key, a first signature, a local model signature, and a local model; verifying (202, 610a), using the first public key and a public verification function, s, that the first signature was generated from a private signature function and the first public key, wherein the public verification function corresponds to the private signature function, s'; verifying (203,
(Continued)

---

201 Receive from a first client node, a first message, the first message comprising: a first public key, PubKeyx, a first signature, Sx, a local model signature, SCx, and a local model, Ux

202 Verify, using the first public key, PubKeyx, and a public verification function, s, that the first signature, Sx, was generated from a private signature function, s', and the first public key

203 Verify, using the local model, Ux, and the first public key, PubKeyx, that the local model signature, SCx, was generated from a first private key, PriKeyx, and the local model

204 Responsive to the verifying steps being successful, utilize the local model to generate an updated global model 612*a*), using the local model and the first public key, that the local model signature was generated from a first private key and the local model, wherein the first public key corresponds to the first private key; and responsive to the verifying steps being successful, utilizing (204, 614) the local model to generate an updated global model.

21 Claims, 9 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 2002/0013898 A1* | 1/2002 | Sudia | G06Q 20/3829 | 380/278 |
| 2008/0141035 A1* | 6/2008 | Furukawa | H04L 9/3221 | 713/180 |
| 2009/0287933 A1* | 11/2009 | Beckwith | H04L 9/3255 | 713/176 |
| 2011/0060903 A1* | 3/2011 | Yoshida | H04L 9/302 | 713/155 |
| 2020/0394518 A1* | 12/2020 | Sirdey | G06N 3/08 | |
| 2021/0150037 A1* | 5/2021 | Radhakrishnan | G06N 3/08 | |
| 2021/0281422 A1* | 9/2021 | Diehl | H04L 9/0894 | |
| 2022/0052843 A1* | 2/2022 | Carver | H04L 9/3073 | |
| 2022/0164712 A1* | 5/2022 | Behera | H04L 9/3239 | |
| 2022/0255764 A1* | 8/2022 | Li | G06F 21/606 | |
| 2023/0008976 A1* | 1/2023 | Xu | H04L 9/3247 | |
| 2023/0025754 A1* | 1/2023 | Hassanzadeh | G06N 20/00 | |
| 2023/0188319 A1* | 6/2023 | Froelicher | G06F 7/544 | 713/189 |
| 2023/0269090 A1* | 8/2023 | Palakodety | H04L 9/3247 | 713/189 |
| 2023/0292117 A1* | 9/2023 | Hemantharaja | H04W 12/069 | |
| 2025/0062892 A1* | 2/2025 | Yan | H04L 9/0825 | |
| 2025/0150462 A1* | 5/2025 | Karakoc | H04L 9/3257 | |

OTHER PUBLICATIONS

IEEE Recommended Practice foor Privacy and Security for Federated Machine Learning (Year: 2023).*

Privacy Preserving Federated Transfer Learning for Driver Drowsiness Detection (Year: 2022).*

Robust Secure Aggregation with Lightweight Verification for Federated Learning (Year: 2022).*

Verifiable Privacy Preserving Federated Learning Under Multiple Encrypted Keys (Year: 2024).*

Abe, Masayuki, et al., "How to date blind signatures", ASIACRYPT 1996: Advances in Cryptology, https://link.springer.com/chapter/10.1007/BFb0034851, 1996, pp. 1-4.

Abe, Masayuki, et al., "Provably Secure Partially Blind Signatures", Conference: Advances in Cryptology—CRYPTO 2000, 20th Annual International Cryptology Conference, Santa Barbara, California, USA, Proceedings, Aug. 20-24, 2000, pp. 272-287.

Blanco-Justicia, Alberto, et al., "Achieving Security and Privacy in Federated Learning Systems: Survey, Research Challenges and Future Directions", Engineering Applications of Artificial Intelligence 106(7), Nov. 2021, pp. 1-40.

Buccafurri, Francesco, et al., "Analysis-preserving protection of user privacy against information leakage of social-network Likes", Information Sciences 328, http://dx.doi.org/10.1016/j.ins.2015.08.046, 2016, pp. 340-358.

Chaum, David, "Blind Signatures for Untraceable Payments", Advances in Cryptology, Springer, Boston, MA; https://doi.org/10.1007/978-1-4757-0602-4_18, Jan. 1, 1982, pp. 199-203.

Chen, Qian, et al., "PPT: A Privacy-Preserving Global Model Training Protocol for Federated Learning in P2P Networks", https://arxiv.org/abs/2105.14408, Aug. 9, 2021, pp. 1-11.

Fan, Chun, et al., "Abstract for Strongly Privacy-Preserving Communication Protocol for VANETs", IEEE Conference Publication, https://ieeexplore.ieee.org/document/7023249, Sep. 2014, pp. 1-2.

Li, Qinghua, et al., "Privacy-preserving participatory sensing", IEEE Communications Magazine, vol. 53 Issue: 8, https://ieeexplore.ieee .org/document/7180510, Aug. 6, 2015, pp. 1-2.

Rahlman, Mohammad Ashiqur, "Privacy Preserving Fine-Grained Data Distribution Aggregation for Smart Grid AMI Networks", Conference Paper, https://www.researchgate.net/publication/330119758, 2018, pp. 1-7.

* cited by examiner

<u>201</u> Receive from a first client node, a first message, the first message comprising: a first public key, PubKeyx, a first signature, Sx, a local model signature, SCx, and a local model, Ux <u>202</u> Verify, using the first public key, PubKeyx, and a public verification function, s, that the first signature, Sx, was generated from a private signature function, s', and the first public key <u>203</u> Verify, using the local model, Ux, and the first public key, PubKeyx, that the local model signature, SCx, was generated from a first private key, PriKeyx, and the local model <u>204</u> Responsive to the verifying steps being successful, utilize the local model to generate an updated global model

Figure 2

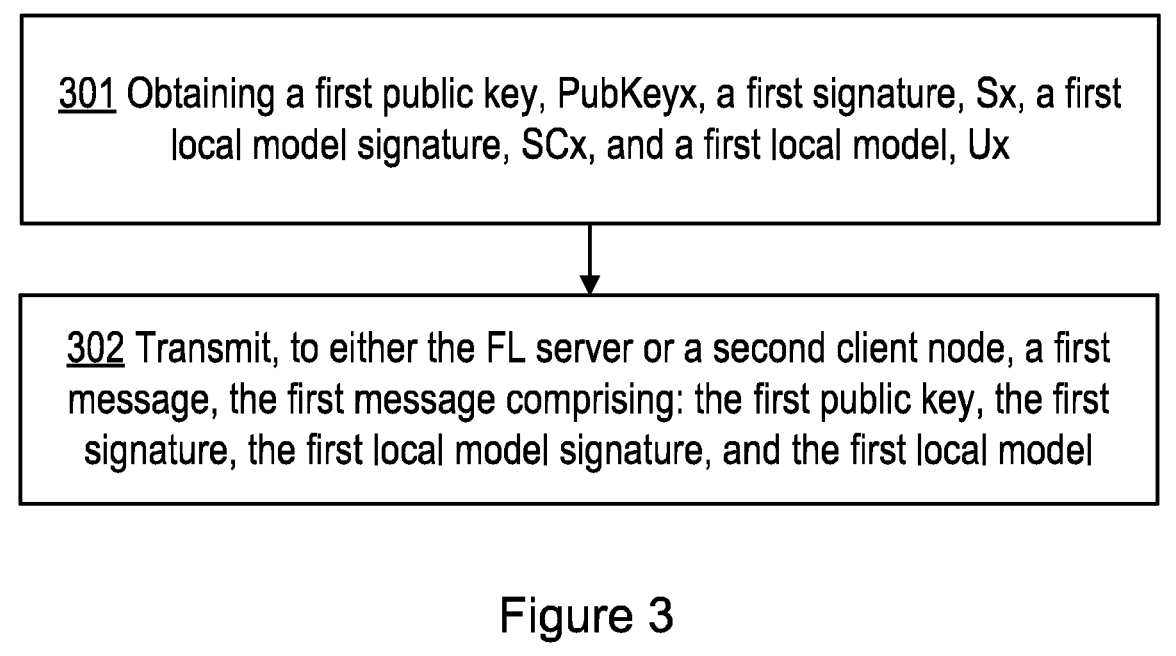

301 Obtaining a first public key, PubKeyx, a first signature, Sx, a first local model signature, SCx, and a first local model, Ux 302 Transmit, to either the FL server or a second client node, a first message, the first message comprising: the first public key, the first signature, the first local model signature, and the first local model

Figure 3

METHODS AND APPARATUSES FOR PERFORMING FEDERATED LEARNING

TECHNICAL FIELD

Embodiments described herein relate to methods and apparatuses for performing federated learning. In particular, embodiments described herein make use of blind or partially blind signature schemes to protect against attacks from malicious client nodes.

BACKGROUND

Federated Learning (FL) is a privacy aware collaborative machine learning (ML) technique. In the setting of the technique, the participants may be an FL server and one or more client nodes. The FL server constructs a global ML model, and the one or more client nodes help with the construction of the global ML model. The privacy enhancement in this technique is that the client nodes transmit update parameters (e.g. local models) to the FL server that are computed using their own data, instead of sending their potentially sensitive data to the FL server. FL may work as follows:

The FL server constructs an initial global ML model and sends it to the client nodes;

Each client node trains the initial global ML model using their own data to obtain a local model;

Each FL client node then sends their local model to the server; and

The FL server aggregates the local models to construct an updated global ML model.

These steps may then be repeated until the updated global model converges.

However, although the private data of each client node is not transmitted (e.g. in cleartext) to the FL server, there are some studies that show the local models that are sent to the FL server may leak some information about the private data of the client nodes. To prevent such leakage of information, the use of some privacy enhancing technologies such as homomorphic encryption, secure multi-party computation, and confidential computing have been proposed.

One of the proposed solutions is the use of secure aggregation. In secure aggregation methods, the client nodes encrypt their local models and then send the encrypted local models to the FL server. The FL server may then aggregate the encrypted local models and decrypt the aggregated result. In this way, the FL server cannot learn the individual local models and may only learn the aggregated output.

However, whilst privacy enhancing technologies such as these may solve the privacy problems, these techniques make it difficult to prevent security attacks against the model construction, such as backdoor and poisoning attacks. The reason for this is that the FL server cannot analyze the data coming from the client nodes because the data is encrypted, and the server can learn only the aggregated result.

Alberto et al. "*Achieving Security and Privacy in Federated Learning Systems: Survey, Research Challenges and Future Directions*" [2012.06810] (arxiv.org) proposed a solution to solve the privacy issue without compromising the security protection mechanisms. According to their solution, when the sender of the data is anonymized to the server, then the server may not be able to leak information from the model updates coming from the client nodes. Below is a brief solution for the data sender anonymization:

"The basic idea is that, instead of each client always submitting her model updates directly to the FL server (which might leak her private data), she chooses to forward her model update to another client, that we call the forwardee. The forwardee may in turn decide to submit the updated model to the FL server or refuse to do it. If the forwardee refuses the request, the update originator tries another forwardee until someone submits her model update to the FL server. This single-hop approach protects the privacy of the update originator versus the FL server because the latter does not know who originated each received update, and further cannot link successive model updates by the same originator. The approach is single-hop, and it does not protect the privacy of clients versus each other (the forwardee knows who originated the received update). To fix this, we can generalize the idea into a multi-hop protocol, whereby a forwardee receiving a model update can submit it or forward it to yet another forwardee. Forwarding is an alternative to refusing the updated model. This multi-hop approach prevents privacy disclosure to both FL server and other clients because neither the FL server nor forwardees know whether they are receiving the model update from the originator or from another forwardee. Moreover, the successive model updates originated by the same client are unlinkable, which goes a long way towards guaranteeing that the private data sets of clients stay confidential. [ . . . ] The proposed solution is satisfactory in terms of privacy with respect to both FL server and other client nodes. Unlike differential privacy, model updates are not perturbed and thus the accuracy of the model is entirely retained. Moreover, the fact that model updates are neither perturbed nor aggregated allows the FL server to compute statistics on the weights and biases of the client updates in order to detect and discard defective (or malicious) updates. The downside is that peer-to-peer forwarding of updates requires clients to communicate with each other and, therefore, introduces a communication overhead."

However, in the aforementioned Alberto et al. FL solution there may be a number of problems that may arise. For example, local model updates may travel between client nodes forever, there is currently no limit. In some cases, a malicious client may send the same model updates more than once (thereby biasing the resulting global ML model). In some examples, a malicious client may drop the model updates of received from other client nodes. In some examples, a malicious client may alter a local model update received from another client.

SUMMARY

According to some embodiments there is provided a method in a federated learning, FL, server for performing FL with N client nodes, where N is an integer number greater than 1. The method comprises receiving from a first client node, a first message, the first message comprising: a first public key, a first signature, a local model signature, and a local model; verifying, using the first public key and a public verification function, s, that the first signature was generated from a private signature function and the first public key, wherein the public verification function corresponds to the private signature function, s'; verifying, using the local model and the first public key, that the local model signature was generated from a first private key and the local model, wherein the first public key corresponds to the first private key; and responsive to the verifying steps being successful, utilizing the local model to generate an updated global model.

According to some embodiments there is provided a method in a first client node for performing federated learning, FL, with a FL server, wherein the first client node is one of N client nodes involved in the FL, where N is an integer value greater than 1. The method comprises obtaining a first public key, a first signature, a first local model signature, and a first local model; and transmitting, to either the FL server or a second client node, a first message, the first message comprising: the first public key, the first signature, the first local model signature, and the first local model.

According to some embodiments there is provided a federated learning, FL, server for performing FL with N client nodes, where N is an integer number greater than 1. The FL server comprises processing circuitry configured to cause the FL server to: receive from a first client node, a first message, the first message comprising: a first public key, a first signature, a local model signature, and an local model; verify, using the first public key and a public verification function, s, that the first signature was generated from a private signature function and the first public key, wherein the public verification function corresponds to the private signature function, s'; verify, using the local model and the first public key, that the local model signature was generated from a first private key and the local model, wherein the first public key corresponds to the first private key; and responsive to the verifying steps being successful, utilize the local model to generate an updated global model.

According to some embodiments there is provided a first client node for performing federated learning, FL, with a FL server, wherein the first client node is one of N client nodes involved in the FL, where N is an integer value greater than 1. The first client node comprises processing circuitry configured to cause the first client node to: obtain a first public key, a first signature, a first local model signature, and an first local model; and transmit, to either the FL server or a second client node, a first message, the first message comprising: the first public key, the first signature, the first local model signature, and the first local model.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 2 illustrates a method in a federated learning, FL, server for performing FL with N client nodes, where N is an integer number greater than 1;

FIG. 3 illustrates a method in a first client node for performing federated learning, FL, with a FL server;

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provide methods and apparatuses for performing federated learning with a server and a plurality of client devices.

Figure 1:
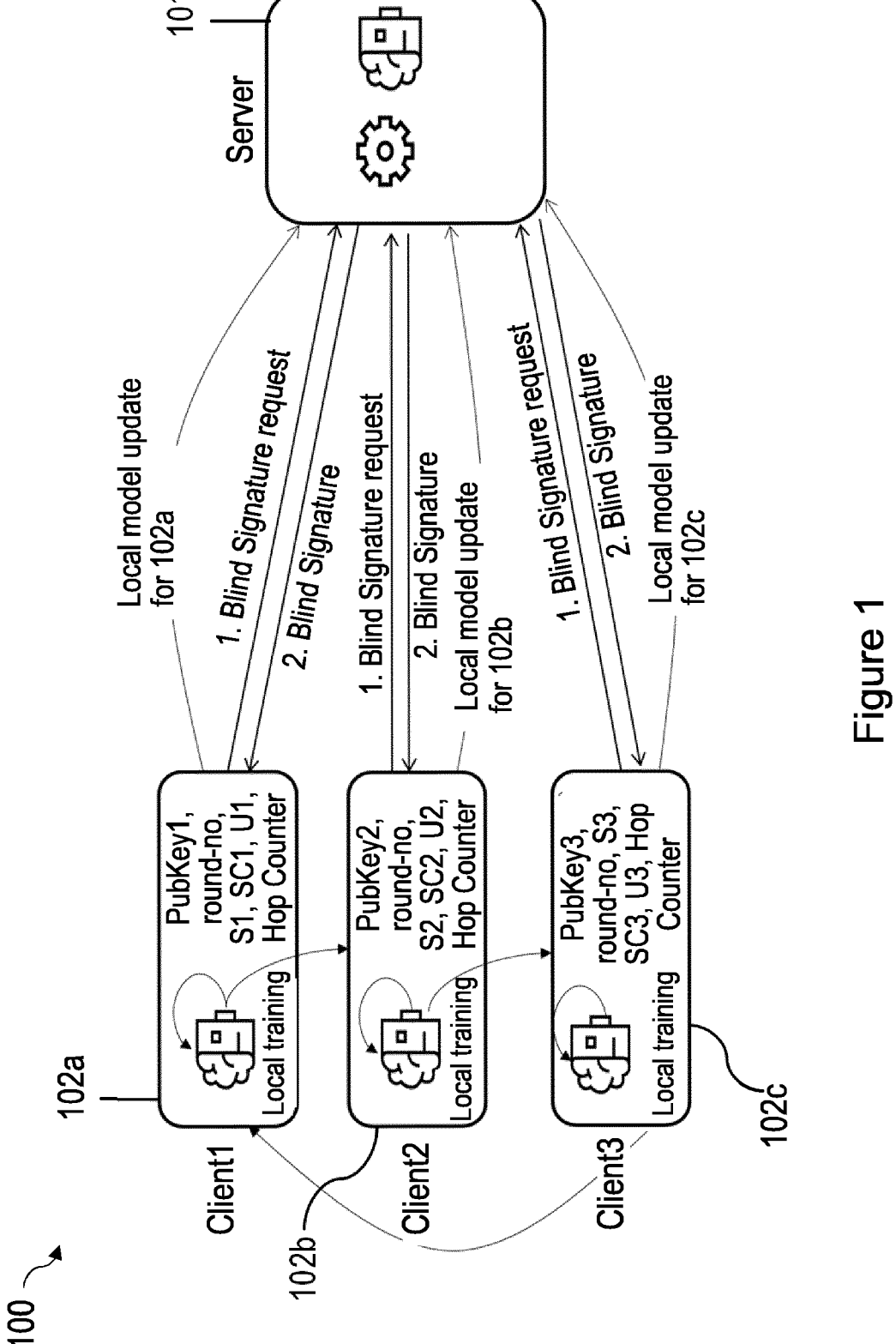
FIG. 1 illustrates a system 100 for performing federated learning.

FIG. 1 illustrates a system 100 for performing federated learning (FL). The system 100 comprises a FL server 101 and three client nodes 102a, 102b and 102c. It will be appreciated that whilst only three client nodes are illustrated, there may be any number, N, where N>1, of client nodes.

As described above, in order to protect the identity of the client node 102a, 102b and 102c that produced a particular local model, each local model may be transmitted to another client node 102a, 102b and 102c (for a number of "hops" as will be described later with reference to FIG. 2), before being transmitted back to the FL server 101. The FL server 101 will therefore not be aware of the identity of the client node 102a, 102b and 102c that produced a particular local model.

Each client node 102a, 102b and 102c may generate a public key and private key pair (PubKeyx and PriKeyx). For example, client node 1 102a generates PubKey1 and PriKey1.

Blind or partially blind signatures may be utilised in order to protect the system from malicious client nodes sending local models a plurality of times or dropping local models received from another client node.

Blind signatures were first introduced by David Chaum in 1983 (Chaum, David (1983). "Blind signatures for untraceable payments" (PDF). *Advances in Cryptology Proceedings of Crypto*. 82 (3): 199-203). This type of signature scheme allows one party to have a signature (sign(x)) for its private data (x) from a signature issuer without leaking any information about the data. This approach was initially proposed for providing untraceable payments. The blind signature protocol (as described in the above reference paper) is as follows:

Functions

Blind Signature systems might be thought of as including the features of true two key digital signature schemes combined in a special way with ommutative style public key systems. A modified version of the blind signature protocol described in the above referenced paper will now be described. The following functions make up the blind signature cryptosystem:

1) A private signature function, s' known only to the signer, and the corresponding public verification function, s, where s (s'(x))=x, and s gives no clue about s'.

2) A commuting functon c and its inverse c', both known only to the provider, such that c'(s'(c(x)))=s'(x), and c(x) and s' give no clue about x.

Protocol

1) The provider chooses x at random, forms c(x), and supplies c(x) to the signer.

2) The signer signs c(x) by applying s' and returns the signed matter s'(c(x)) to the provider.

3) The provider strips the signed matter by applying c', yielding c'(s'(c(x)))=s'(x)

4) Anyone may then check that the stripped matter s'(x) was formed by the signer by verifying, using x and the signer's public verification function s, that s'(x) was generated from s' and x, wherein s corresponds to the s', where s (s'(x))=x.

Partially blind signatures are also available. Partially blind signatures enable the signature issuer (which for embodiments descibred herein may be the server) to input additional information into the data before signing the data of the consumer (which for embodiments descibred herein may be the client nodes). In other words, if x is the data of the client node and y is the data of the FL server, after running the protocol for the blind signature, the client node may learn the signature of (x,y) and the FL server learns nothing about x. The notion of partially blind signatures was introduced by Abe M., Fujisaki et al. in their paper titled "*How to date blind signatures*" In: Kim K., Matsumoto T. (eds) Advances in Cryptology—ASIACRYPT '96. ASIACRYPT 1996. Lecture Notes in Computer Science, vol 1163. Springer, Berlin, Heidelberg.

In Abe, Masayuki and T. Okamoto. "Provably Secure Partially Blind Signatures." CRYPTO (2000), secure and efficient partially blind signature schemes were proposed.

After these studies on partially blind signatures were published, many constructions using different tools such as Rivest-Shamir-Adleman (RSA) or Elliptic Curve Digital Signature Algorithm (ECDSA), bilinear parings etc. have been proposed to realize the partially blind signatures. The main application areas of these partially blind signatures has been electronic cash systems and electronic voting.

By using a blind or partially blind signature scheme, in each round of FL, the FL server 101 issue a signature, S'x, for each client node's 102a, 102b and 102c public key (and in some examples, the round number of the round of FL being performed) without actually receiving the public key directly from the client node 102a, 102b, 102c. This means that the FL server 101 is unable to match the public keys and the client nodes 102a, 102b, 102c. In other words, the FL server 101 receives a transform, Tx, of the public key from each client node 102 (e.g. the FL server 101 receives T1 from client node 1 102a, T2 from client node 2 102b and T3 from client node 3 102c), where the transform is generated using a function c(x) which is commutable when applied to a private signature function s' (x) of the FL server 101. For example, c'(s'(c(x))=s'(x).

The FL server 101 may then transmit the signed transform as the signature, S'x, to each client node 102a, 102b and 102c (e.g. the FL server may transmit S'1 to client node 1 102a, S'2 to client node 2 102b and S'3 to client node 3 102c) along with the current global model.

Each client node 102a, 102b and 102c may then perform local training of the current global model to generate a local model, Ux (for example U1 is generated by client node 1 102a, U2 is generated by client node 2 102b and U3 would be generated by client node 3 102c). The local training at each client node 102a, 102b and 102c will utilise local data collected at each client node 102a, 102b and 102c.

Each client node 102a, 102b and 102c may then sign its own local model, Ux, using their private key, PriKeyx (e.g. PriKey1 for client node 1 102a, PriKey2 for client node 2 102b and PriKey3 for client node 3 102c), to generate a local model signature, SCx (e.g. client node 1 102a signs U1 with PriKey1 to generate SC1, client node 2 102b signs U2 with PriKey2 to generate SC2, and client node 3 102c would sign U3 with PriKey3 to generate SC3). The local model signature, SCx, may then be passed between the client nodes 102a, 102b and 102c before reaching the FL server 101. The local model signature, SCx, may be transmitted (at each hop) in a model update message along with the public key, PubKeyx, a signature, Sx (e.g. S1 for client node 1 102a, S2 for client node 2 102b and S3 for client node 3 102c), generated from the signature S'x; and the local model Ux. In some examples the model update message may further comprise a hop counter.

In particular, to avoid a local model being passed infinitely (or for a impractical number of times) between client nodes, embodiments described herein may make use of a hop counter associated with each local model. This may therefore limit the number of client nodes that a local model may be forwarded between.

When the information in the model update message reaches the FL server 101, the FL server may then be able to perform one or more verifications in order to determine whether to utilize the local model in the process of updating the current global model.

Adoption of machine learning techniques on telecom systems leverage intelligent solutions to the problems of, for example, large overhead, energy consumption, interference mitigation, resource allocation, and network complexity. Federated learning (FL) may be used to predict the network status, enabling network automation. FL may also improve the proactive network decisions by learning from the wireless device (e.g. UE) activities in the network.

One possible example implementation of the system 100, would be use FL to predict Reference Signal Received Power (RSRP) (or any other relevant parameters or performance related parameters) on the network side using the UE's local data to enhance e.g., mobility decisions. For example, the FL server 101 may comprise a base station, and the N client nodes 102a, 102b and 102c may comprise wireless devices (e.g. UEs) in the network.

Alternatively, the FL server 101 may comprise a base band unit of a base station and the client nodes 102a, 102b and 102c may comprise radio units of a base station. In this example, the FL may be used to predict maintenance of a hardware fault at a radio unit.

In some examples, the FL server 101 comprises a Network Data Analytics Function (NWDAF) in a core network (for example a 5G core network, although it will be appreciated that similar network functions may be implemented in different core networks), and the N client nodes 102a, 102b and 102c each comprise a network function. In this example, the FL may be used to enhance data analytic functionalities in the network.

The use of FL in vertical industries is also advancing. For autonomous vehicle use cases where a massive amount of data is produced by variety of sensors, FL may be used for ML based vehicular applications such as vehicle management (e.g. autonomous driving) or traffic management (e.g., infotainment and route planning). In such cases, the N client nodes 102a, 102b and 102c may comprise vehicles devices. The vehicle devices may produce data on the edge of the vehicle network and may collaborate on training tasks with the FL server 101 (which may be implemented as a cloud server, or may comprise one of the vehicle devices).

Similarly, in smart manufacturing, the use of FL is also promising to improve ML tasks among several connected edge/Industrial constrained devices (such as IoT devices) like connected robots, smart actuators etc. In this example, the N client nodes may comprise constrained devices such as IoT devices.

FL may also be applied in different business use cases between companies (e.g., industrial business partners, banks, healthcare companies) when the different businesses do not wish to share sensitive (business related or customer related) data. yet they desire to have a common ML model beneficial for all contributing companies. In this example, each client node may be owned by a different owner (e.g. business or company).

The method performed by the FL server 101 will now be described with reference to FIG. 2.

FIG. 2 illustrates a method in a federated learning, FL, server for performing FL with N client nodes, where N is an integer number greater than 1. The FL server may comprise the FL server 101 as illustrated in FIG. 1.

It will be appreciated that the FL server may comprise a physical or virtual node, and may be implemented in a computing device or server apparatus and/or in a virtualized environment, for example in a cloud, edge cloud or fog deployment.

In step 201 the method comprises receiving from a first client node, a first message, the first message comprising: a first public key, PubKeyx, a first signature, Sx, a local model signature, SCx, and an local model, Ux. Herein a first message may also be referred to as a model update message.

Figure 6:
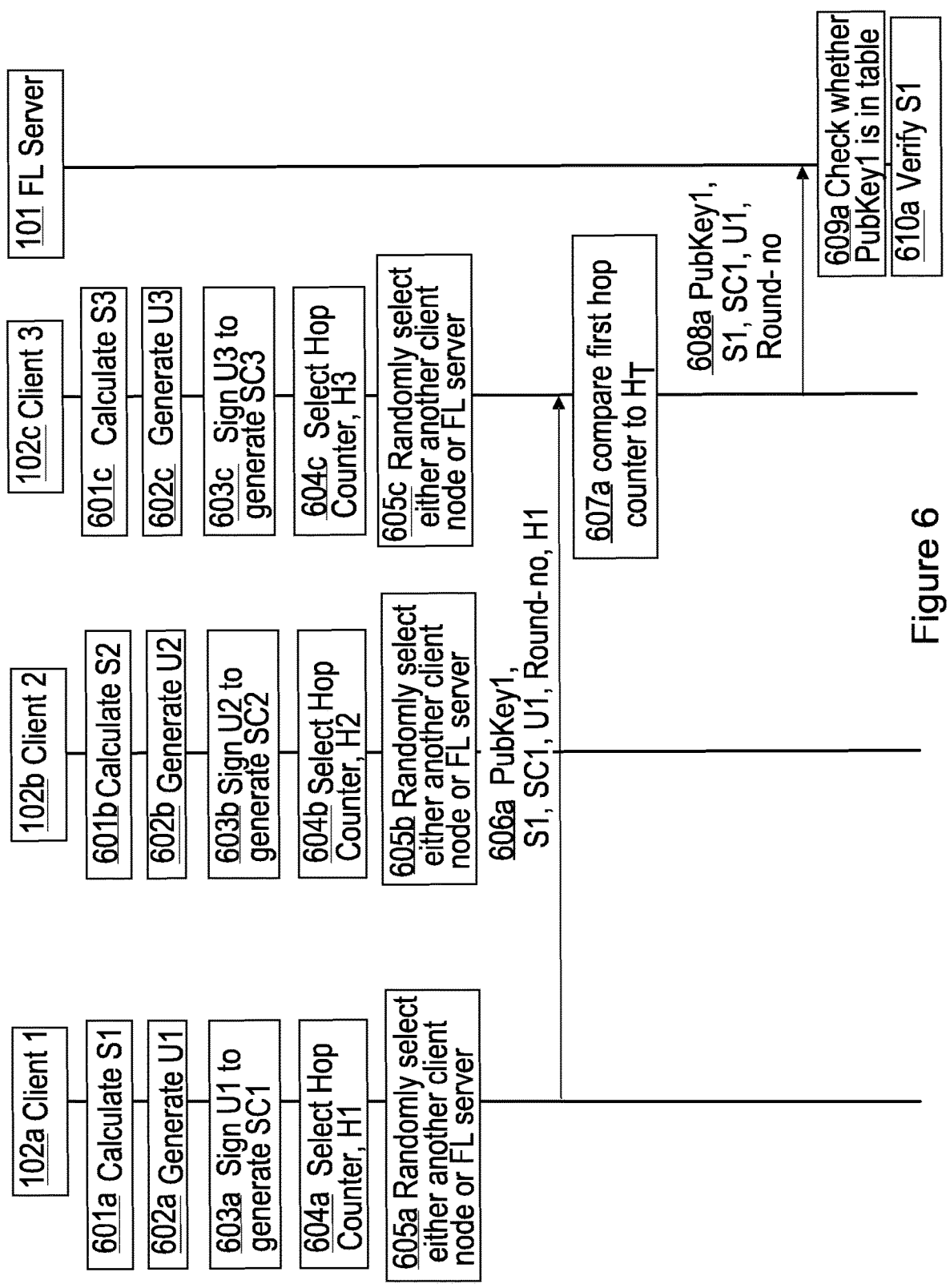
FIG. 6 is a signalling diagram illustrating an example implementation of part of the methods of FIGS. 2 and 3.
Figure 6:
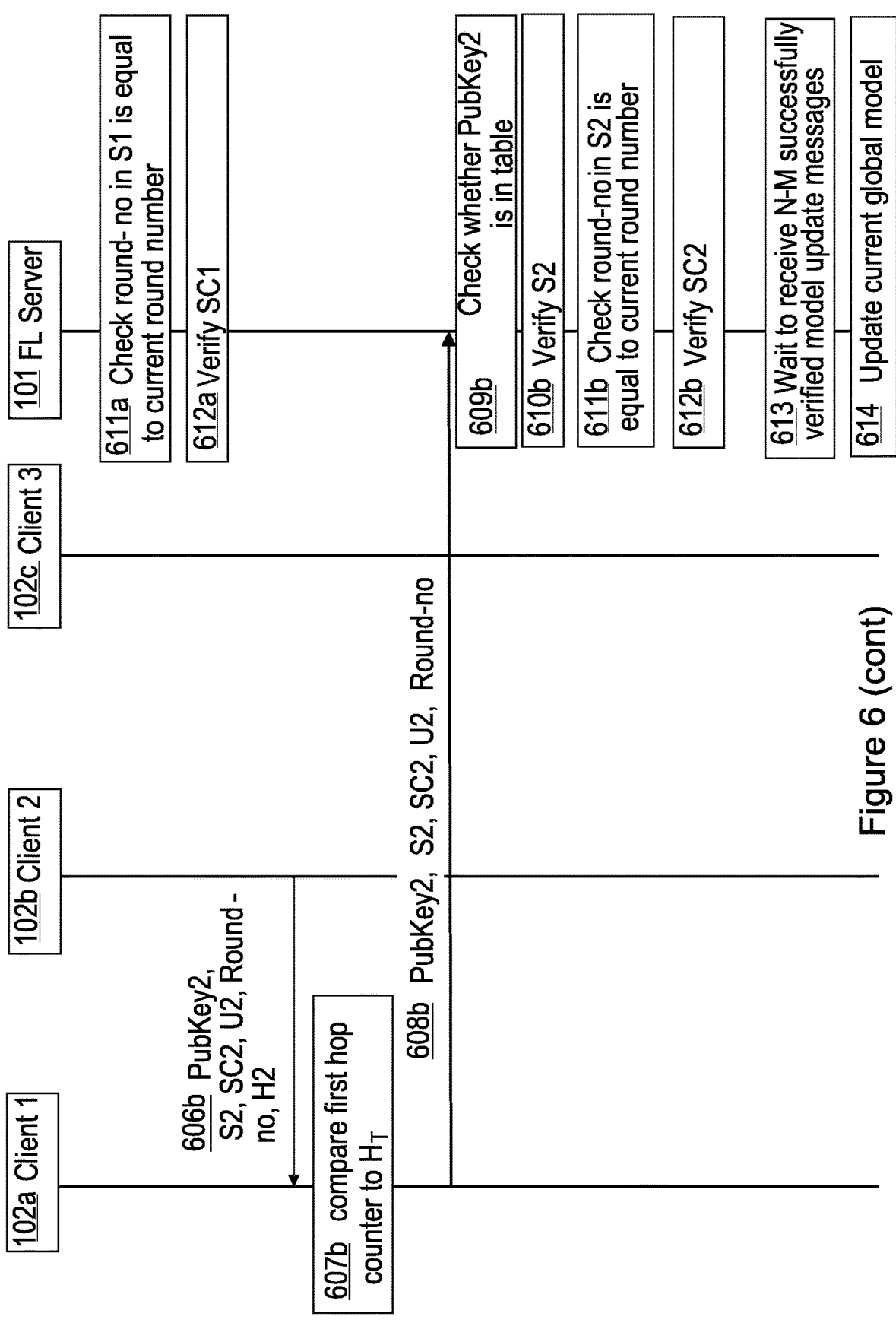

With reference to FIG. 6 described in more detail later, the model update message 608 received from the client node 102c may be considered a first message according to some embodiments.

In step 202, the method comprises verifying, using the first public key, PubKeyx, and a public verification function, s, that the first signature, Sx, was generated from a private signature function, s', and the first public key. The public verification function corresponds to the private signature function, s'. In particular, the public verification function, s, and the private signature function, s', may be generated by the FL server. The public verification function and the private signature function may be generated according to a blind or partially blind signature scheme as described above.

Step 202 may comprise the public verification function receiving the first signature and the first public key as inputs. The public verification function may then output a validation result that indicates whether the first signature was generated by signing the first public key with the private signature function. If the validation result indicates that the first signature was generated by signing the first public key with the private signature function, the verifying of step 202 may be considered successful.

In step 203, the method comprises verifying, using the local model, Ux, and the first public key, PubKeyx, that the local model signature, SCx, was generated from a first private key, PriKeyx, and the local model, Ux. The first public key, PubKeyx, corresponds to the first private key, PriKeyx. As previously described the first public key and the first private key may be generated by a client node as pair of asymmetric keys for use in a digital signature scheme.

Step 203 may comprise a verifying algorithm of the digital signature scheme receiving the local model signature, the first public key, and the local model as inputs. The verifying algorithm may then output a validation result that indicates whether the local model signature, SCx was generated by signing the local model, Ux, with the first private key, PriKeyx. If the validation result indicates that the local model signature, SCx was generated by signing the local model, Ux, with the first private key, PriKeyx, the verifying step 203 may be considered successful.

In step 204, the method comprises, responsive to the verifying steps being successful, utilizing the local model to generate an updated global model. In other words, if both the validation results in steps 202 and 203 are successful, the method may determine that the data in the first message has not been tampered with, and that therefore the local model can be utilized in the generation of an updated global model, for example, according to known federated learning methods.

In some examples, the method of FIG. 2 further comprises receiving a second message from a second client node, the second message comprising a first transform, wherein the first transform is generated by applying a first function, c, to the first public key, wherein the first function, c, is a commutable function such that c'(s'(c(x))=s'(x), where c' is an inverse of the first function; signing the first transform using the private signature function, s', to generate a second signature, S'x and transmitting a third message to the second client node, wherein the third message comprises the second signature.

The second message may be considered a request for a blind or partially blind signature. The third message may be considered a response to the second message, wherein the third message comprises the blind or partially blind signature.

In some examples, as will be described with more detail with reference to FIGS. 5 and 6, the second client node is the same as the first client node (e.g. if the first client node randomly selects to send its own model update message to the FL server), and in some examples, the second client node is different to the first client node (e.g. if the first client node selects to first transmit its own model update message to another client node).

FIG. 3 illustrates a method in a first client node for performing federated learning, FL, with a FL server. The first client node is one of N client nodes involved in the FL, where N is an integer value greater than 1. It will be appreciated that the FL server may be configured to perform the method as described with reference to FIG. 2. The first client node may comprise a client node 102*a*, 102*b* or 102*c* as illustrated in FIG. 1.

It will be appreciated that the first client node may comprise a physical or virtual node and may be implemented in a computing device or server apparatus and/or in a virtualized environment, for example in a cloud, edge cloud or fog deployment.

In step 301 the method comprises obtaining a first public key, PubKeyx, a first signature, Sx, a first local model signature, SCx, and an first local model, Ux.

In step 302 the method comprises transmitting, to either the FL server or a second client node, a first message, the first message comprising: the first public key, the first signature, the first local model signature, and the first local model. In other words, as described above with reference to FIG. 1, each client node may be configured to either pass the first message on to another one of the client nodes, or to pass the first message directly to the FL server. Similarly to as described above, the first message may also be referred to herein as a model update message.

In some examples, the various pieces of information comprised in the first message are relevant to the first client node. In these examples, as previously mentioned, the first client node may generate the first public key, PubKeyx, and a corresponding first private key, PriKeyx, based on a digital signature scheme. The local model, Ux, may be generated by the first client node training a received current global model utilizing local data at the first client node. How the first signature, Sx, the first local model signature, SCx, may be obtained is described in more detail with reference to FIGS. 5 and 6.

In accordance with these examples, and with reference to FIG. 6 described in more detail later, the message 606 comprises a first message for the client node 102*a*.

In some other examples, the various pieces of information comprised in the first message are first received from a third client node. In these examples, the various pieces of information comprised in the first message are relevant to a client node other than the first client node (e.g. the third client node or any other client node).

In accordance with these examples, and with reference to FIG. 6 described in more detail later, the message 608 comprises a first message for the client node 102*c*.

The selection of whether the first message is passed on to another client node or the FL server may be based on a hop counter associated with the first local model in the first message. In examples in which the various pieces of information comprised in the first message are relevant to the first client node, the selection of whether the first message is passed on to another client node or the FL server may be random.

In some examples (e.g. where the various pieces of information comprised in the first message are first received from a third client node), the method of FIG. 3 may further comprise generating a key pair comprising a second public key and a second private key.

The method of FIG. 3 may then further comprise calculating a first transform by applying a first function, c, to the second public key, wherein the first function, c, is such that $c'(s'(c(x)))=s'(x)$, where c' is an inverse of the first function; and transmitting a second message to the FL server, wherein the second message comprises the first transform.

Responsive to transmitting the second message, the method may further comprise receiving a third message from the FL server, wherein the third message comprises a second signature; applying the inverse, c', of the first function to the second signature to determine a third signature; and responsive to verifying, using the second public key and a public verification function, s, that the third signature was generated from a private signature function and the second public key, wherein the public verification function corresponds to the private signature function, s', updating a current global model to generate a second local model.

The method may then further comprise signing the second local model with the second private key to generate a second local model signature. The method may then further comprise transmitting, to either the FL server or a fourth client node, a fourth message, the fourth message comprising: the second public key, the third signature, the second local model signature, and the second local model. A fourth message may also be referred to herein as a model update message. In particular a fourth message may comprise a model update message that originates at the client node that generates the information in the model update message. For example, steps 606*a* and 606*b* of FIG. 6 comprises model update messages that may be considered a fourth message.

Figure 4:
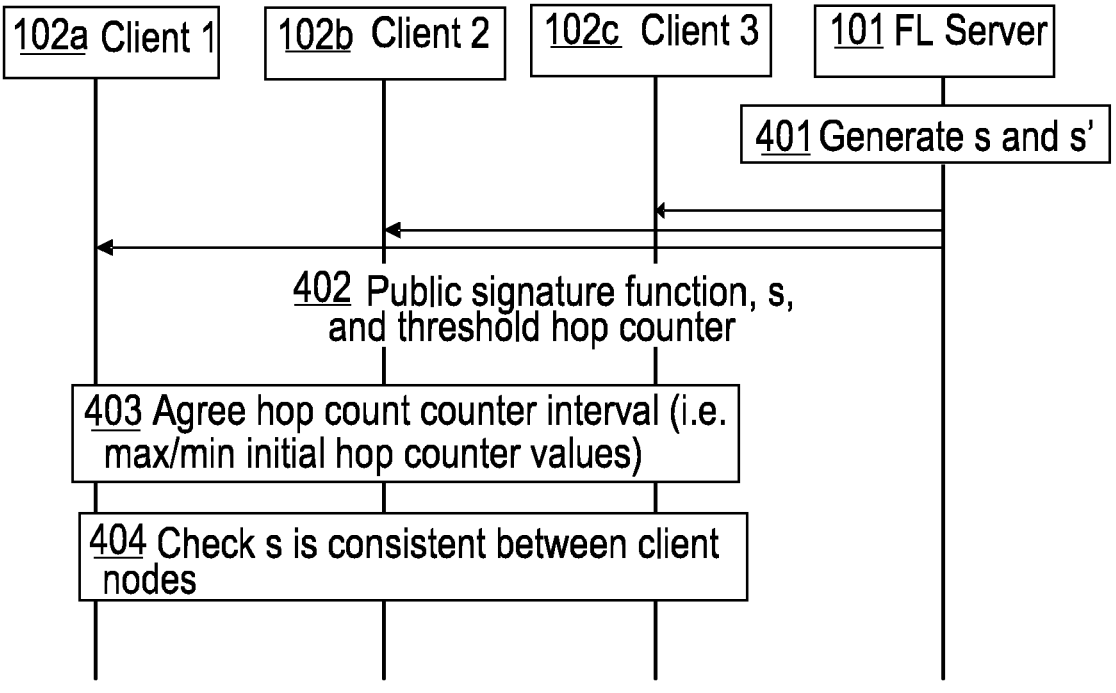
FIG. 4 illustrates a method of initialising a round of FL in a FL system such as that illustrated in FIG. 1.

FIG. 4 illustrates a method of initialising a round of FL in a FL system such as that illustrated in FIG. 1. It will be appreciated that each of the client nodes 102*a* to 102*c* may be configured to perform the method as described with reference to FIG. 3. The FL server may be configured to perform the method as described with reference to FIG. 2.

In step 401 the FL server 101 generates the private signature function, s' and the corresponding public verification function, s.

In step 402, the FL server 101 transmits the public verification function, s to each of the client nodes 102*a*, 102*b*, 102*c*. Step 402 may also comprise the FL server transmitting a threshold hop counter, $H_T$, to each of the client nodes 102*a*, 102*b* and 102*c*. The threshold hop counter may in some examples be sent in a different message to the public verification function.

In step 403, the client nodes 102*a*, 102*b* and 102*c* agree a hop counter interval. The hop counter interval may comprise maximum and minimum initial values of a hop counter. How this hop counter interval may be utilised is described in more detail below.

In step 404, the client nodes 102*a*, 102*b* and 102*c* check that the public verification function, s, is consistent between the client nodes 102*a*, 102*b* and 102*c*. For example, the client nodes 102*a*, 102*b* and 102*c* may check that a public verification key associated with the public verification function is the same for each client node. With this check the client nodes 102*a*, 102*b* and 102*c* ensure that the memory-less property for blindness is satisfied. For the memoryless property for blindness, the secret key used in the private signature function should stay the same throughout the protocol.

Figure 5:
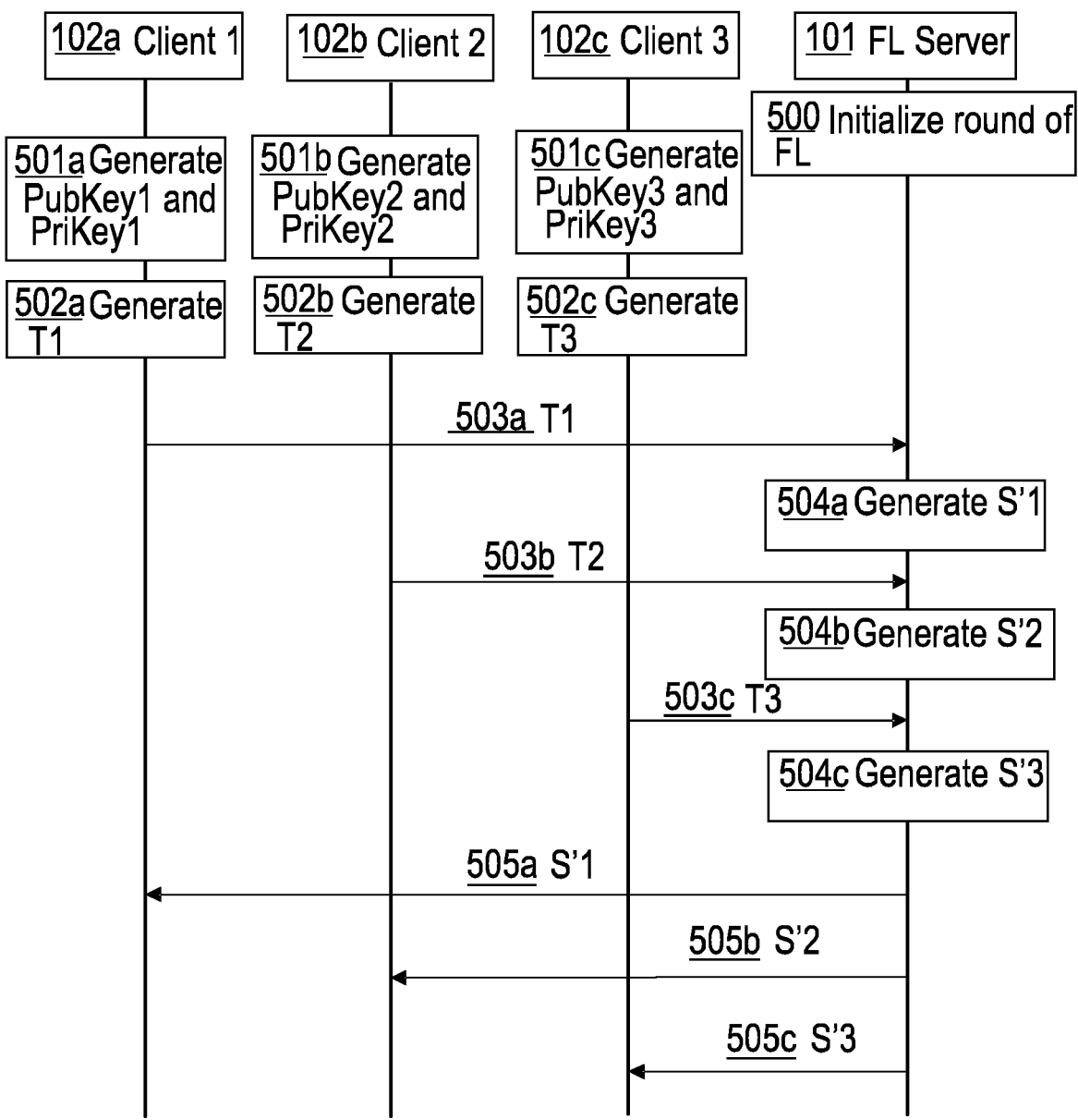
FIG. 5 is a signalling diagram illustrating an example implementation of parts of the methods of FIG. 2 and FIG. 3.

FIGS. 5 and 6 illustrate an example implementation of the methods of FIGS. 2 and 3.

FIG. 5 is a signalling diagram illustrating an example implementation of parts of the methods of FIG. 2 and FIG. 3. It will be appreciated that whilst only three client nodes are illustrated, there may be any number, N, where N>1, of client nodes.

In step 500, the FL server may initialise a round of FL. Step 500 may comprise initializing a round of federated learning by setting a current round number. The current round number may comprise as an incremental increase from a previous round number of a previous round of FL learning. The FL server 101 may transmit the current round number to each of the client nodes in order to initialize the round of FL.

Each client node 102a, 102b and 102c performs the same initial steps 501 to 505 with the FL server 101.

In steps 501a, 501b and 501c each client node (Client x) generates a public key, PubKeyx, and a private key, PriKeyx, pair (as described above). Steps 501a, 501b and 501c may be performed responsive to initialisation of the FL round.

In step 502a, 502b and 503b each client node generates a transform Tx of the public key. The transform Tx may be calculated applying a first function, c, to the first public key, PubKeyx, wherein the first function, c, is a commutable function such that $c'(s'(c(x))=s'(x)$, where c' is an inverse of the first function.

In steps 503a, 503b and 503c, each client node 102a, 102b and 102c may then transmit, to the FL server 101, a message (which may be referred to as a second message herein) comprising the transform Tx.

In step 504a, 504b and 504c, the FL server generates a signature S'x. The signature S'x may be referred to as a "second signature" herein. The signature S'x may be generated by signing the transform Tx with the private signature function s'. For example, S'x may be $S'x=s'(c(PubKeyx))$.

In some examples, (e.g. where a partially blind signature technique is utilised), the signature S'x may be generated by inserting a current round number representative of the current round of FL into the transform. Note that the algorithm used to insert the round-no in the data to be signed depends on the used partially blind signature scheme.

For example, the signature S'x may be $S'x=s'(c(PubKey_x, round\text{-}no))$

In steps 505a, 505b and 505c, the FL server 101 then transmits, to each client node, a message (which may be referred to as a third message herein) comprising the signature S'x. The message comprising the signature S'x may further comprise the current global model. Alternatively or in addition, the current global model may be sent to each client node 102a, 102b, 102c in separate messages.

FIG. 6 is a signalling diagram illustrating part of the implementation of the method of FIGS. 2 and 3. It will be appreciated that whilst only three client nodes are illustrated, there may be any number, N, where N>1, of client nodes.

On receipt of the signature S'x and the current global model, each client node may perform steps 601 to 605.

In step 601a, the client node 102a calculates a signature S1 (which may be referred to as a first signature herein). The signature S1 may be generated by applying the inverse of the first function to the signature S'1. Effectively therefore, the signature S1 is may be $S1=c's'(c(PubKey1, round\text{-}no))=s'$ $(PubKey1, round\_no)$. In some examples, step 601a corresponds to step 301 of FIG. 3.

In step 601a the client node may also verify, using the public key PubKey1, and the public verification function, s, that the signature, S1, was generated from the private signature function and the public key, PubKey1. Again, this verification may provide a validation result indicative of whether the verification is successful. If this verification fails, this implies that the FL server 101 is potentially malicious and is potentially using a different secret key to try to break the anonymity of the client nodes. If the verification is successful, the client node may perform step 602a.

Step 602a may comprise updating the current global model to generate a local model U1. Again, this training of the current global model may be performed using data locally available at the client node 102a.

In step 603a the client node may comprise signing the local model U1 with the private key, PriKey1, to generate a local model signature, SC1.

In step 604a, the client node may randomly select an initial hop counter, H1, as a value between the maximum initial hop counter value, $H_{ma1}$, and minimum initial hop counter value, $H_{min}$ (e.g. as set in step 403 of FIG. 4). By randomly selecting an initial hop counter within this predetermined interval, the identity of the client node that generated the local model may be disguised from the other client nodes. If the initial hop counter value for data generated by a client node was fixed, a receiving client node may be able to ascertain that, as the received initial hop counter was equal to that fixed value, then the sending client node is likely to be the originating client node. The receiving client node may then be able to leak the originating client node's identity.

Based on the aforementioned steps, the client node may formulate a model update message (which may be referred to as a first message or a fourth message) comprising the following information: the public key, PubKey1, the signature, S1, the local model signature, SC1, and the local model, U1. In some examples, the model update message may further comprises the round number, round-no, and the initial hop counter determined in step 604a.

In step 605a, the client node randomly selects either the FL server or another client node to transmit the model update message to. The model update message may then be transmitted to the node selected in step 605a.

Client nodes 102b and 102c may, similarly to as described for steps 601a to 605a, perform corresponding steps 601b to 605b and 601c to 605c respectively. These steps may be performed in parallel to steps 601a to 605a, or not.

In the example of FIG. 6, for client node 102a, the client node 102c is randomly selected in step 605a.

Step 606a therefore comprises transmitting the model update message generated by the client node 102a to the client node 102c. In some examples (e.g. from the point of view of client node 102a) step 606a corresponds to step 302 of FIG. 3. In some examples (e.g. from the point of view of the client node 102a) step 606a corresponds to step 301 of FIG. 3.

If the client node 102c were a malicious client node, it may attempt to tamper with the information in the model update message of step 606a. However, as the client node 102c does not have access to the private key, PriKey1, of the client node 102a, even if it attempts to alter the data of the local model, it would not be able to recreate a signed version of the altered local model, and therefore later verification steps in the FL server would be unsuccessful, and the tampered with data would be dropped.

In step 607a, the client node 102c calculates a first hop counter based on the initial hop counter. In this example, the initial hop counter, Hx, is changed by a fixed amount by each client node that receives the model update message until the threshold hop counter, $H_T$, is reached. It will however be appreciated that the system could be implemented with either a lower threshold hop counter or an upper threshold hop counter. The hop counter, Hx, may therefore be decreased (for a lower threshold hop counter) or increased (for an upper threshold hop counter) by a fixed amount by each client node that receives the model update message until the threshold hop counter (either upper or lower) is reached.

In this example, in step 607a, the client node 102c calculates the first hop counter by changing (e.g. decreasing) the initial first hop counter by X, where X is an integer value (e.g. 1).

Step 607a may then further comprise comparing the first hop counter to the threshold hop counter, $H_T$. The client node may then, responsive to a first hop counter associated with the first local model being equal to or less than a lower hop counter threshold or equal to or greater than an upper hop counter threshold, transmit the model update message to the FL server. Responsive to the first hop counter being greater than a lower hop counter threshold or less than an upper hop counter threshold, the client node may randomly select either the FL server or another client node to transmit the model update message to.

In this example, the client node 102c determines to transmit the model update message to the FL server.

In step 608a, the client node 102c therefore transmits the model update message to the FL server 101. When transmitting the model update message to the FL server 101, the client node 102c may remove the initial hop counter from the model update message. However, if the client node 102c were to select another client node to transmit the model update message to, the client node 102c may be configured to replace the initial hop counter with the first hop counter in the model update message.

Whilst in this example only one "hop" to another client node is illustrated, it will be appreciated that there may be many hops between client nodes that occur before either the FL server is randomly selected, or the hop counter threshold is reached. Each client node that receives a model update message will treat the model update message as described with reference to FIGS. 607a and 608a.

Responsive to receiving the model update message, the FL server 101 performs steps 609a to 612a.

In step 609a, the FL server 101 checks whether the first public key PubKey1, has been previously stored in a table in order to ensure that a public key is only used once.

Responsive to the first public key being previously stored in the table on receipt of the model update message, the FL server will refrain from using the local model, U1, to generate an updated global model (e.g. in step 614). For example, the FL server 101 may, responsive to the first public key being previously stored in the table on receipt of the model update message, drop the information received in the model update message without further processing it.

In step 610a, the FL server 101 verifies the first signature, S1. As previously mentioned, S1 may be defined as S1=s' (PubKey1, round-no). The FL server 101 may therefore verify the first signature by utilizing the public verification function, s. In particular, the first signature, S1, and the PublicKey1 (and, in some examples, the current round number as set by the FL server in step 500) are used as inputs to the public verification function, s. The validation result output by the public verification function, s will then indicate whether or not the first signature S1 is verified successfully, for example if the first signature was generated from the private signature function and the first public key. The verification of step 610a may correspond to step 202 of FIG. 2.

Responsive to verifying that the first signature was generated from the private signature function, the first public key and, in some examples, the round number, and responsive to the first public key not being previously stored in the table on receipt of the model update message, the FL server 101 may then store the first public key in the table (in some examples, with the round number, round-no).

Responsive to determining that the first signature was not generated from the private signature function and the first public key and, in some examples, the round number, refraining from using the local model to generate an updated global model (e.g. in step 614). For example, the FL server 101 may drop the data received in step 608a without further processing it.

In step 611a, the FL server 101 checks whether the round number received in in step 608a is correct. In other words, the FL server 101 may compare the round number received in step 608a to the current round number to check that they are the same. If the round number in step 608a and the current round number are not the same, the FL server may refrain from using the local model, U1, to generate an updated global model.

In step 612a, the FL server 101 verifies the local model signature, SC1. For example, the FL server may, utilize a verifying algorithm of the digital signature scheme to receive the local model signature, SC1, the first public key, PubKey1, and the local model, U1 as inputs. A validation result output by the verifying algorithm may then indicate whether the local model signature, SC1 was generated by signing the local model U1 with the first private key, PriKey1. The verification of step 612a may correspond to step 203 of FIG. 2.

If the validation result indicates that the local model signature, SC1 was generated by signing the local model U1 with the first private key, PriKey1, the FL server 101 may then utilize the local model U1 to generate an updated global model in step 614 later.

If the validation result indicates that the local model signature, SC1 was not generated by signing the local model U1 with the first private key, PriKey1, the FL server may refrain from utilizing the local model U1 to generate an update global model.

Corresponding steps 606b to 612b (that are similar to 606a to 612a) are also performed for the client node 102b. In this example client node 102b selects client node 102a to transmit the model update message to in step 606b. The client node 102b then passes the model update message to the FL server in step 608b. It will however be appreciated that scenarios may occur in which the model update message it transmitted between client nodes more times before being transmitted to the FL server 101.

It will be appreciated that steps 606c to 612c may also be performed for client node 102c that correspond to steps 606a to 612a and 606b to 612b, however, these have not been illustrated for clarity.

It will also be appreciated, that the steps performed for the model update messages generated by each client node may be performed in parallel, or one after the other.

In step 613, the FL server waits to receive at least N-M model update messages that result in successful verification steps as described above (in the example illustrated in FIG. 6, N=3). N-M may therefore be considered as a number of local models required to perform an update to the current global model. If the number N-M of successful model update messages is reached in a predefined time period, then the FL server performs an update of the current global model in step 614. Step 614 may correspond to step 204 of FIG. 2. The method may then return to step 500 and a new round of FL may be initialised.

In other words, responsive to receiving N-M model update messages from N-M client nodes, where M is an integer value greater than or equal to 0, wherein the verifying steps for each of the N-M model update messages are successful, the FL server performs the step of generating an updated global model based on N-M local models received in the N-M model update messages (e.g. step 614).

In some examples, it will be appreciated that packet drops from malicious client nodes may be entirely rejected by the system by setting M=0. In this case (M=0), the FL server will wait to receive packets from all the client nodes in the system in each FL round.

However, by setting M>0, execution of the FL may occur when at most M local model updates may be dropped by malicious client nodes or by some other communication reasons, so that some attacks such as DOS attacks by malicious client nodes may be prevented.

Each client node will only be able to send one successfully verified model update message due to the usage of the signature S1, and the storage of the public keys in a table. These features ensure that each public key is only used once, and prevent client nodes from having repeats of the same model update message accepted by the FL server.

If the FL server were to wait for N successfully verified model update messages, a single drop of a model update message by a malicious client node would halt the execution of the FL round and the FL server 101 would have to restart the FL round after a predefined time period.

However, by setting M=0 malicious client nodes can easily execute a DOS attack because dropping only one model update message will lead the FL server having to restart the FL round because N model update messages would not be received. Thus, the value of M may be tuned by considering the number of model update messages that is acceptable to allow to be dropped, and the likelihood of DOS attacks.

Figure 7:
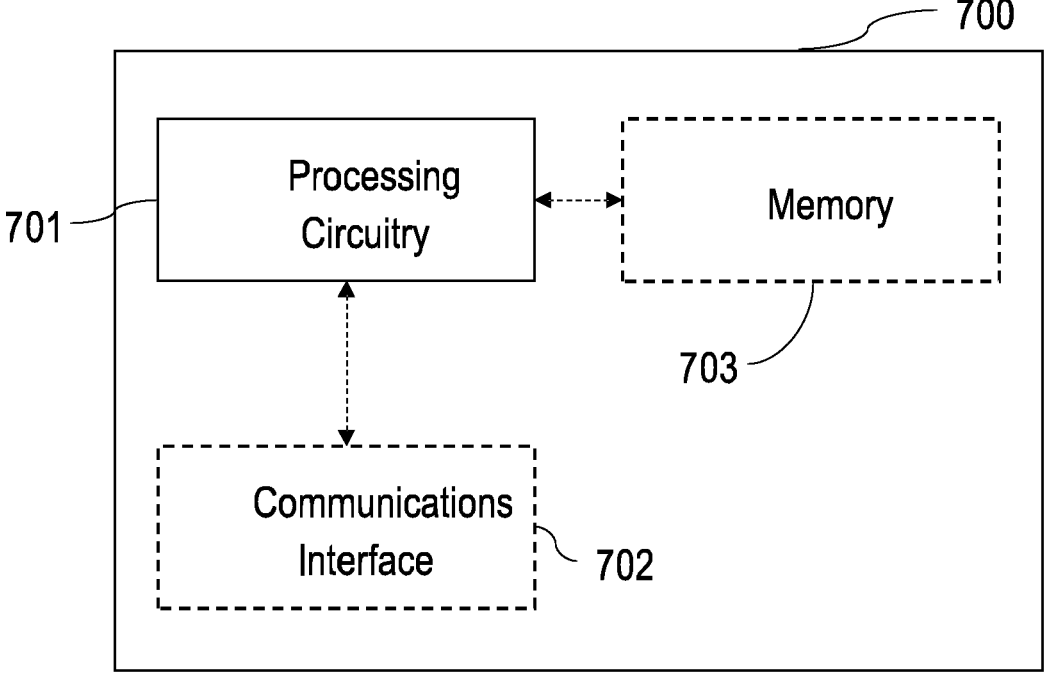
FIG. 7 illustrates an FL server comprising processing circuitry (or logic)

It will also be appreciated that, to prevent traffic analysis, client nodes may utilize garbled data and random delays before forwarding the incoming data model update messages. This may further protect the identities of the client nodes producing the local models FIG. 7 illustrates an FL server 700 comprising processing circuitry (or logic) 701. The processing circuitry 701 controls the operation of the FL server 700 and can implement the method described herein in relation to an FL server 700. The processing circuitry 701 can comprise one or more processors, processing units, multi-core processors or modules that are configured or programmed to control the FL server 700 in the manner described herein. In particular implementations, the processing circuitry 701 can comprise a plurality of software and/or hardware modules that are each configured to perform, or are for performing, individual or multiple steps of the method described herein in relation to the FL server 700.

Briefly, the processing circuitry 701 of the FL server 700 is configured to: receive, from a first client node, a first message, the first message comprising: a first public key, a first signature, an local model signature, and a local model; verify, using the first public key and a public verification function, s, that the first signature was generated from a private signature function and the first public key, wherein the public verification function corresponds to the private signature function, s'; verify, using the local model and the first public key, that the local model signature was generated from a first private key and the local model, wherein the first public key corresponds to the first private key; and responsive to the verifying steps being successful, utilize the local model to generate an updated global model.

In some embodiments, the FL server 700 may optionally comprise a communications interface 702. The communications interface 702 of the FL server 700 can be for use in communicating with other nodes, such as other virtual nodes. For example, the communications interface 702 of the FL server 700 can be configured to transmit to and/or receive from other nodes requests, resources, information, data, signals, or similar. The processing circuitry 701 of FL server 700 may be configured to control the communications interface 702 of the FL server 700 to transmit to and/or receive from other nodes requests, resources, information, data, signals, or similar.

Optionally, the FL server 700 may comprise a memory 703. In some embodiments, the memory 703 of the FL server 700 can be configured to store program code that can be executed by the processing circuitry 701 of the FL server 700 to perform the method described herein in relation to the FL server 700. Alternatively or in addition, the memory 703 of the FL server 700, can be configured to store any requests, resources, information, data, signals, or similar that are described herein. The processing circuitry 701 of the FL server 700 may be configured to control the memory 703 of the FL server 700 to store any requests, resources, information, data, signals, or similar that are described herein.

Figure 8:
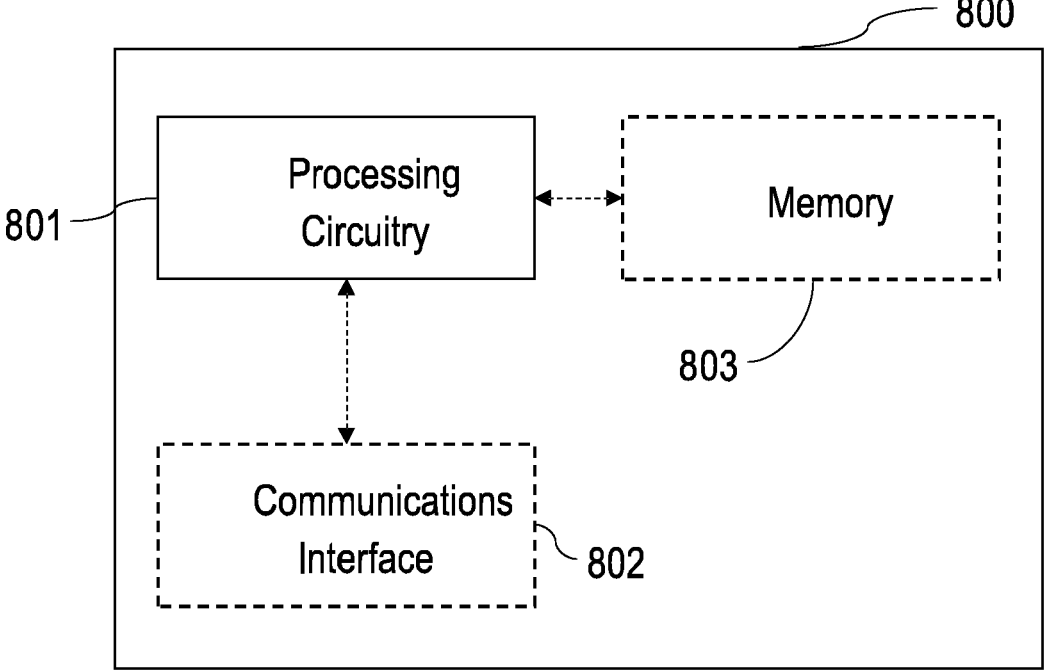
FIG. 8 illustrates a first client node comprising processing circuitry (or logic).

FIG. 8 illustrates a first client node 800 comprising processing circuitry (or logic) 801. The processing circuitry 801 controls the operation of the first client node 800 and can implement the method described herein in relation to a client node. The processing circuitry 801 can comprise one or more processors, processing units, multi-core processors or modules that are configured or programmed to control the first client node 800 in the manner described herein. In particular implementations, the processing circuitry 801 can comprise a plurality of software and/or hardware modules that are each configured to perform, or are for performing, individual or multiple steps of the method described herein in relation to the first client node 800.

Briefly, the processing circuitry 801 of the client node 800 is configured to: obtain a first public key, a first signature, a first local model signature, and an first local model; and transmit, to either the FL server or a second client node, a first message, the first message comprising: the first public key, the first signature, the first local model signature, and the first local model.

In some embodiments, the first client node 800 may optionally comprise a communications interface 802. The communications interface 802 of the first client node 800 can be for use in communicating with other nodes, such as other virtual nodes. For example, the communications interface 802 of the first client node 800 can be configured to transmit to and/or receive from other nodes requests, resources, information, data, signals, or similar. The processing circuitry 801 of first client node 800 may be configured to control the communications interface 802 of the first client node 800 to transmit to and/or receive from other nodes requests, resources, information, data, signals, or similar.

Optionally, the first client node 800 may comprise a memory 803. In some embodiments, the memory 803 of the first client node 800 can be configured to store program code that can be executed by the processing circuitry 801 of the first client node 800 to perform the method described herein in relation to the first client node 800. Alternatively or in addition, the memory 803 of the first client node 800, can be configured to store any requests, resources, information, data, signals, or similar that are described herein. The processing circuitry 801 of the first client node 800 may be configured to control the memory 803 of the first client node 800 to store any requests, resources, information, data, signals, or similar that are described herein.

There is also provided a computer program comprising instructions which, when executed by processing circuitry (such as the processing circuitry 701 of the FL server 700 or the processing circuitry 801 of the first client node 800 described earlier), cause the processing circuitry to perform at least part of the method described herein. There is provided a computer program product, embodied on a non-transitory machine-readable medium, comprising instructions which are executable by processing circuitry to cause the processing circuitry to perform at least part of the method described herein.

There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein allow an FL server to analyze the data gathered from the client nodes without compromising their privacy so that security attacks stemming from malicious client nodes (such as backdoor or data poisoning) can be detected. This detection of security attacks may be difficult with previous solutions such as cryptographic privacy methodologies (e.g. Homomorphic encryption (HE) or Secure multiparty computation (SMPC)).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a federated learning (FL) server for performing FL with N client nodes, wherein N is an integer greater than 1, wherein the method comprises:

receiving from a first client node a first message comprising: a first public key, a first signature, a local model signature, and an local model;

using the first public key and a public verification function (s), verifying that the first signature was generated from a private signature function (s') and the first public key, wherein the public verification function corresponds to the private signature function;

using the local model and the first public key, verifying that the local model signature was generated from a first private key and the local model, wherein the first public key corresponds to the first private key; and responsive to verifying the first signature being successful and to verifying the local model signature being successful, utilizing the local model to generate an updated global model.

2. The method of claim 1, further comprising:

receiving from a second client node a second message comprising a first transform, wherein the first transform is generated by applying a first function (c) to the first public key, wherein the first function is a commutable function such that c'(s'(c(x))=s'(x), where c' is an inverse of the first function;

signing the first transform using the private signature function to generate a second signature; and transmitting to the second client node a third message comprising the second signature and the third global model.

3. The method of claim 1, further comprising refraining from using the local model received in the first message to generate an updated global model, responsive to determining one or more of the following:

that the first public key was stored in a table accessible to the FL server prior to receipt of the first message, and that the first signature was not generated from the private signature function and the first public key.

4. The method of claim 1, further comprising storing the first public key in the table, responsive to the following: verifying that the first signature was generated from the private signature function and the first public key, and determining that the first public key was stored in the table prior to receipt of the first message.

5. The method of claim 1, wherein:

verifying that the first signature was generated from the private signature function and the first public key comprises verifying that the first signature was generated from the private signature function, the first public key, and a current round number of the FL; and refraining from using the local model to generate an updated global model, responsive to determining that the first signature was not generated from the private signature function, the first public key, and the current round number.

6. The method of claim 5, further comprising initializing a round of the FL by setting the current round number to be an incremental increase from a previous round number.

7. The method of claim 1, wherein:

the first message is one of N-M first messages received from respective N-M client nodes, wherein M is an integer value greater than or equal to 0;

utilizing the local model to generate an updated global model is responsive to verifying the first signature being successful for all N-M of the first messages and to verifying the local model signature being successful for all N-M of the first messages; and the updated global model is generated based on the N-M local models received in the N-M first messages.

8. The method of claim 1, further comprising transmitting one or more of the following to each of the N client nodes: the public verification function, and a hop counter threshold.

9. The method of claim 1, wherein one of the following applies:

the N client nodes are included in respective vehicle devices and the FL server is included in a cloud server or in one of the vehicle devices;

the N client nodes are included in respective constrained devices;

the FL server is included in a baseband unit of a base station and each of the N client nodes is included in one of the following: a user equipment, or a radio unit of the base station; or the FL server is included in a network data analytics function (NWDAF) of a core network, and the N client nodes are included in respective network functions of the core network.

10. A method for a first client node configured to perform federated learning (FL) with a FL server, wherein the first client node is one of N client nodes involved in the FL, wherein N is an integer greater than 1, wherein the method comprises:

obtaining a first public key, a first signature, a first local model signature, and a first local model; and transmitting, to the FL server or to a second client node, a first message comprising the first public key, the first signature, the first local model signature, and the first local model.

11. The method of claim 10, wherein the first message is transmitted to the FL server responsive to a first hop counter associated with the first local model meeting one of the following conditions: being equal to or less than a lower hop counter threshold, or being equal to or greater than an upper hop counter threshold.

12. The method of claim 10, wherein the first message is transmitted to a randomly selected one of the FL server or the second client node, responsive to the first hop counter meeting one of the following conditions: being greater than the lower hop counter threshold, or being less than the upper hop counter threshold.

13. The method of claim 10, wherein the first message includes the first hop counter when the first message is transmitted to the second client node.

14. The method of claim 10, wherein:
the first public key, the first signature, the first local model signature, and the first local model are obtained by receiving from a third client node; and
the method further comprises:
receiving an initial first hop counter associated with the first local model from the third client node; and
calculating the first hop counter by changing the initial first hop counter by X, where X is an integer.

15. The method of claim 10, further comprising:
generating a key pair comprising a second public key and a second private key, wherein the second public key comprises the first public key;
calculating a first transform by applying a first function (c) to the second public key, wherein the first function is arranged such that $c'(s'(c\,(x))=s'(x)$, where c' is an inverse of the first function; and
transmitting a second message to the FL server, wherein the second message comprises the first transform.

16. The method of claim 15, further comprising:
responsive to transmitting the second message, receiving a third message from the FL server, wherein the third message comprises a second signature and the third global model;
applying the inverse of the first function to the second signature to determine a third signature; and
updating a current global model to generate a second local model, responsive to verifying, using the second public key and a public verification function(s), that the third signature was generated from a private signature function and the second public key, wherein the public verification function corresponds to the private signature function (s').

17. The method of claim 16, further comprising:
signing the second local model with the second private key to generate a second local model signature;
randomly selecting one of the following nodes: the FL server, or a fourth client node; and transmitting, to the selected node, a fourth message comprising: the second public key, the third signature, the second local model signature, and the second local model.

18. The method of claim 17, wherein:
the fourth message includes a second hop counter value when the fourth message is transmitted to the fourth client node, and
the second hop counter value is a randomly selected value between a maximum initial hop counter value and a minimum initial hop counter value.

19. The method of claim 10, wherein one of the following applies:
the N client nodes are included in respective vehicle devices and the FL server is included in a cloud server or in one of the vehicle devices;
the N client nodes are included in respective constrained devices;
the FL server is included in a baseband unit of a base station and each of the N client nodes is included in one of the following: a user equipment, or a radio unit of the base station; or
the FL server is included in a network data analytics function (NWDAF) of a core network, and the N client nodes are included in respective network functions of the core network.

20. A federated learning (FL) server configured to perform FL with N client nodes, where N is an integer greater than 1, wherein the FL server comprises processing circuitry configured to:
receive from a first client node a first message comprising: a first public key, a first signature, a local model signature, and an local model;
using the first public key and a public verification function (s), verify that the first signature was generated from a private signature function (s') and the first public key, wherein the public verification function corresponds to the private signature function;
using the local model and the first public key, verify that the local model signature was generated from a first private key and the local model, wherein the first public key corresponds to the first private key; and
responsive to verification of the first signature being successful and to verification of the local model signature being successful, utilize the local model to generate an updated global model.

21. A first client node configured to perform federated learning (FL) with a FL server, wherein the first client node is one of N client nodes involved in the FL, wherein N is an integer greater than 1, wherein the first client node comprises processing circuitry configured to perform the method of claim 10.

* * * * *